United States Patent [19]

Furuya et al.

[11] Patent Number: 4,920,478
[45] Date of Patent: Apr. 24, 1990

[54] CACHE SYSTEM USED IN A MAGNETIC DISK CONTROLLER ADOPTING AN LRU SYSTEM

[75] Inventors: Akihiko Furuya; Kouiti Kanamaru; Junichi Inoue, all of Tokyo, Japan

[73] Assignees: Kabushiki Kaisha Toshiba, Kawasaki; Toshiba Computer Engineering Corporation, Tokyo, both of Japan

[21] Appl. No.: 329,019

[22] Filed: Mar. 24, 1989

Related U.S. Application Data

[62] Division of Ser. No. 867,449, May 28, 1986, Pat. No. 4,835,686.

[30] Foreign Application Priority Data

| May 29, 1985 | [JP] | Japan | 60-115918 |
| Jun. 19, 1985 | [JP] | Japan | 60-133432 |
| Aug. 29, 1985 | [JP] | Japan | 60-190308 |
| Feb. 27, 1986 | [JP] | Japan | 61-42258 |

[51] Int. Cl.⁵ ............................................. G06F 12/12
[52] U.S. Cl. ............................... 364/200; 364/243.4; 364/238.4; 364/259.2
[58] Field of Search .................. 364/200 MS File

[56] References Cited

U.S. PATENT DOCUMENTS

| 3,806,883 | 4/1974 | Weisbecker | 364/200 |
| 4,008,460 | 2/1977 | Bryant et al. | 364/200 |
| 4,197,580 | 4/1980 | Chang et al. | 364/200 |
| 4,313,158 | 1/1982 | Porter et al. | 364/200 |
| 4,322,795 | 3/1982 | Lange et al. | 364/200 |
| 4,354,232 | 10/1982 | Ryan | 364/200 |
| 4,394,732 | 7/1983 | Swenson | 364/200 |
| 4,410,941 | 10/1983 | Barrow et al. | 364/200 |
| 4,525,777 | 6/1985 | Webster et al. | 364/200 |
| 4,530,054 | 7/1985 | Hamstra et al. | 364/200 |
| 4,593,354 | 6/1986 | Ushiro | 364/200 |

Primary Examiner—Thomas M. Heckler
Attorney, Agent, or Firm—Finnegan, Henderson, Farabow, Garrett and Dunner

[57] ABSTRACT

A magnetic disk controller incorporating a cache memory which employs an LRU (Least Recently Used) scheme in a replacement algorithm of cache blocks and comprising a directory memory whose entries have LRU counter fields, a host system issuing a read/write command to which an arbitrary LRU settling value is appended, a directory search circuit, and a microprocessor. The directory search circuit searches the directory memory in response to the read/write command issued from the host system. The microprocessor stores the LRU setting value appended to the read/write command in the LRU counter field of the hit entry of the directory memory or of the entry corresponding to the repalacement target cache block, in response to the search result of the directory search circuit.

3 Claims, 13 Drawing Sheets

F I G. 5
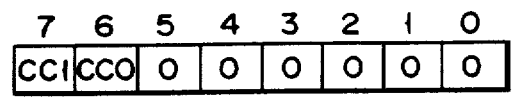
F I G. 6
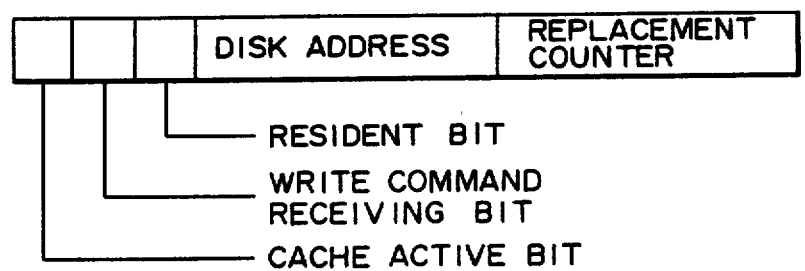
F I G. 7
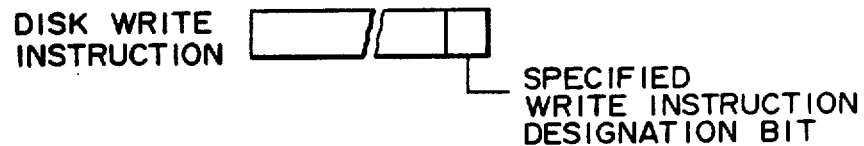
F I G. 8
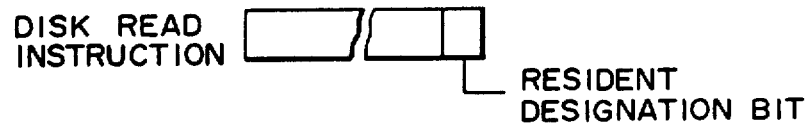

F I G. 12
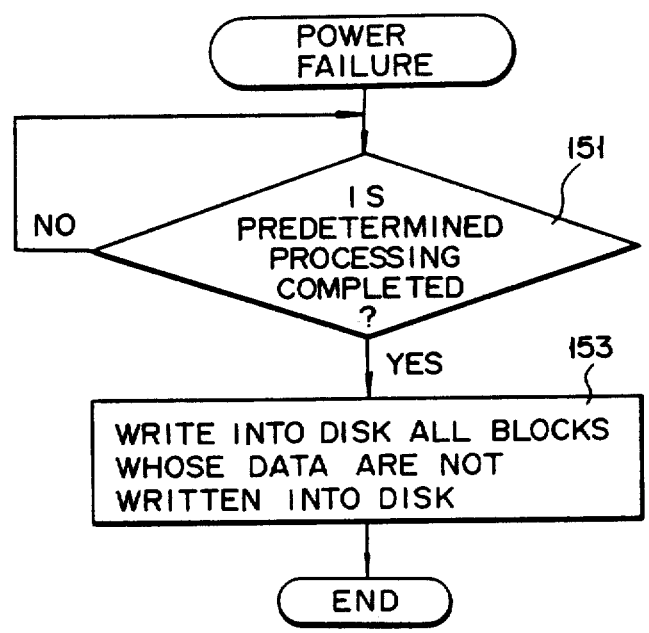

CACHE SYSTEM USED IN A MAGNETIC DISK CONTROLLER ADOPTING AN LRU SYSTEM

This is a division of application Ser. No. 06/867,449, filed May 28, 1986, now U.S. Pat. No. 4,835,686.

BACKGROUND OF THE INVENTION

The present invention relates to a cache system adopting an LRU (Least Recently Used) system in a replacement algorithm for cache blocks, and to a magnetic disk controller incorporating the cache system.

Disk cache systems capable of high-speed data access to magnetic disks have been developed. A disk cache is a memory device using a semiconductor RAM and is designed to eliminate an access gap between a high-speed main memory and low-speed large-capacity secondary memories (i.e., magnetic disk units). The disk cache is normally arranged between the main memory and a magnetic disk unit, in a magnetic disk controller, and serves as a data buffer.

The principle of the disk cache is the same as that of a central processing unit (CPU) cache. If a CPU first accesses part of a file, necessary data blocks are stored on a disk. In this case, the disk cache does not contribute to such CPU access.

Necessary blocks are transferred from the disk to the main memory. At the same time, they are written in the disk cache. If the CPU subsequently accesses the same blocks, they are transferred from the disk cache, but not from the disk. The access time of the magnetic disk unit is normally 20 to 30 ms, while the access time of the disk cache is about 1 to 3 ms. The access time can, therefore, be decreased to about 1/10. When a total access time is regarded as an input/output response time including data transfer time and channel wait time, it can be normally decreased to $\frac{1}{2}$ to $\frac{1}{3}$.

Since a disk cache capacity is smaller (about 1/1000) than that of the disk, all file blocks required by the CPU are not always stored in the disk cache. In order to load new blocks when the disk cache is filled with file blocks, old blocks must be removed from it. When accessing of the cache allows retrieval of necessary data from the cache, it is called a "hit", and when retrieval of necessary data cannot be performed, it is called a "miss". The average hit times per times of the difference of the cache is called a hit ratio.

In addition to the disk cache, disk cache mechanism components are a disk cache handler as a program in the input/output controller, a data transfer mechanism between the main memory and the disk cache, and a disk cache directory. The disk cache handler cooperates with an operating system (OS) to determine the hit/miss ratio of the disk cache, control of data transfer between the main memory, the disk cache, and the magnetic disks, and acquisition of data representing utilization efficiency of the disk cache and the hit ratio, and so on.

Write access schemes include a write through scheme and a write back scheme. The write through scheme is called a store through scheme for writing directory data in a disk. The cache hit processing is performed in such a way that the cache hit block is disabled by not writing data therein, or the data is written in the cache hit block after it is directly written into the disk.

The write back scheme is called a store in, copy back, or post store scheme. According to this scheme, the disk cache write is the highest priority. When a data write into a file in the disk cache is completed, data input/output is completed. If the file is unnecessary or the cache block storing the file must be emptied for other files, data is transferred from the cache to the disk.

In the disk cache, data copying from the magnetic disk to the cache memory is called staging, and copying from the cache memory to the magnetic disk is called destaging.

A typical disk cache memory mapping scheme is a set associative scheme. According to this scheme, the magnetic disk and the disk cache memory are divided into a plurality of blocks (e.g., one block = one track = 64 sectors). Blocks belong to columns, respectively. In order to transfer a given block from the magnetic disk to the cache memory, this block is written in an identical column of the cache memory and data (representing which block, i.e., a block number, in the magnetic disk is stored in the cache memory) is stored in the directory in units of columns. By referring this directory, it is possible to determine whether specific data is stored in the cache memory or not. If the data is stored in the cache memory, it can be read out, not from the magnetic disk unit but from the cache memory.

The disk cache replacement algorithm is an LRU algorithm. LRU stands for "Least Recently Used." According to the LRU algorithm, the block which stays in the cache for the longest period after the last access is selected as the least necessary block. In a disk cache having no empty space, if the cache memory must be assigned for new staging, the least necessary track data is removed to obtain an empty space. The LRU algorithm is used to assure this empty space.

If a cache hit occurs as a result of the directory search, the LRU value in the cache directory corresponding to the hit cache block is initialized to "0". In the case of cache miss, the LRU value corresponding to the cache block to be replaced must be registered again. In this case, if the cache miss occurs in the read request mode, the corresponding data block is read out from the magnetic disk unit and is stored in the cache block in the cache memory which is to be replaced.

In a conventional cache system, LRU setting values are determined regardless of the data blocks stored in the cache memory.

The frequency of use of the data blocks stored in the cache blocks varies according to different types of files. Once a data block having a low frequency of use is stored in the cache block, the resident possibility of that data block in the cache memory is often higher than that of a file having a high frequency of use. Because of this, a decrease in hit rate of the cache memory tends to occur.

In the conventional disk cache system of this type, disk write operation is always performed in response to a disk write instruction from a host system. According to the conventional system, even if the data in the disk area subjected to disk write is stored in the cache memory (even if cache hit occurs), the contents of the cache memory and the disk unit are simultaneously updated. This is to not allow non-updated data to be left in the disk when a failure, such as a power failure, occurs.

According to the system described above, however, high performance of the disk cache structure can be achieved only when, the read frequency is high. If the write frequency is high, a great deal of improvement in performance cannot be expected.

When a power unit free from the effects of power failure is used, disk write need not be performed at the time of cache hit in the write request mode. However, a power unit of this type is very expensive.

Assume that a read access request for a given file is sent from the CPU. The magnetic disk controller retrieves a disk cache directory (a table having file information such as a file name, a file size, and a file address) and checks if the data block of interest is stored in the disk cache. If cache hit occurs, the corresponding data block is transferred from the cache memory to the main memory.

In the case of cache miss, however, several blocks (usually those for one track) including the required block are sent to the cache memory, and only the required block is sent to the main memory. Data transfer to the cache memory is performed simultaneously with that to the main memory. However, the blocks can be transferred to the cache memory and the block of interest can be transferred to the main memory thereafter.

A large demand has arisen for a magnetic disk controller for satisfying the above-mentioned two transfer schemes and for performing effective data transfer control if a cache miss occurs.

If a cache memory is used in common by 4 magnetic disk drives, e.g., DK0 through DK3, different cache memory areas are permanently assigned for respective drives DK0 through DK3, and a directory memory having a corresponding memory allocation is prepared, as shown in FIG. 1.

According to the system described above, however, the limited area of the cache memory is divided, and the cache locations respectively assigned to the magnetic disk drives are decreased, leading to a reduction in the cache hit rate. If the access frequency varies for the different drives, the frequency of use of the cache memory location corresponding to the drive having the lowest access frequency is decreased. As a result, the overall utilization efficiency of the cache memory is degraded.

SUMMARY OF THE INVENTION

It is an object of the present invention to provide a cache system wherein setting values for LRU initialization or re-registration are variables and the resident possibility of data blocks in the cache memory can be controlled.

It is another object of the present invention to provide a disk cache system wherein the frequency of data written in the disk can be decreased without using an expensive power source unit to improve system performance.

It is still another object of the present invention to provide a magnetic disk controller for effectively performing data transfer control upon occurrence of read errors and for achieving high-speed transfer.

It is still another object of the present invention to provide a magnetic disk controller capable of effectively using a cache memory in common for a plurality of magnetic disk drives, regardless of their number.

In order to achieve the above objects of the present invention, there is provided a cache memory, having a plurality of cache blocks in a magnetic disk controller used in common by a plurality of magnetic disk drive units, comprising:

a direct memory having entries respectively corresponding to the cache blocks in the cache memory in fields in which directory data are stored including disk block addresses of disk block stores in the cache blocks respectively corresponding to entries and disk drive identifiers representing the respective magnetic disk drive units;

director search means for searching whether a target disk block is stored in the cache memory by comparing directory data in each entry of the directory memory with the target block designation data, in response ti a read/write command including target disk block designation data comprising the disk drive identifier and a disk logical address; and means for storing the directory data in a director memory entry corresponding to one of the cache blocks to be replaced, on the basis of a search result of the directory search means and the read/write command.

BRIEF DESCRIPTION OF THE DRAWINGS

Other objects and features of the present invention will be apparent from the following description taken in connection with the accompanying drawings, in which:

FIG. 5 is a format of an LRU setting value;

FIG. 6 is a format of directory data stored in directory memory $35_1$ according to another embodiment of a disk cache system of the present invention;

FIG. 7 is a format showing the main part of a disk write instruction employed in the embodiment of FIG. 6;

FIG. 8 is a format showing the main part of a disk read instruction used in the embodiment of FIG. 6;

FIGS. 9 through 12 are flow charts for explaining the operation of the embodiment in FIG. 6, in which FIG. 9 is a flow chart for explaining control of magnetic disk controller 20 when the disk write instruction is supplied thereto from a host system, FIG. 10 is a flow chart of the search subroutine, FIG. 11 is a flow chart for explaining control of magnetic disk controller 20 when the disk read instruction is supplied thereto from the host system, and FIG. 12 is a flow chart for explaining the operation of magnetic disk controller 20 during a power failure;

DETAILED DESCRIPTION OF THE PREFERRED EMBODIMENTS

Figure 2:
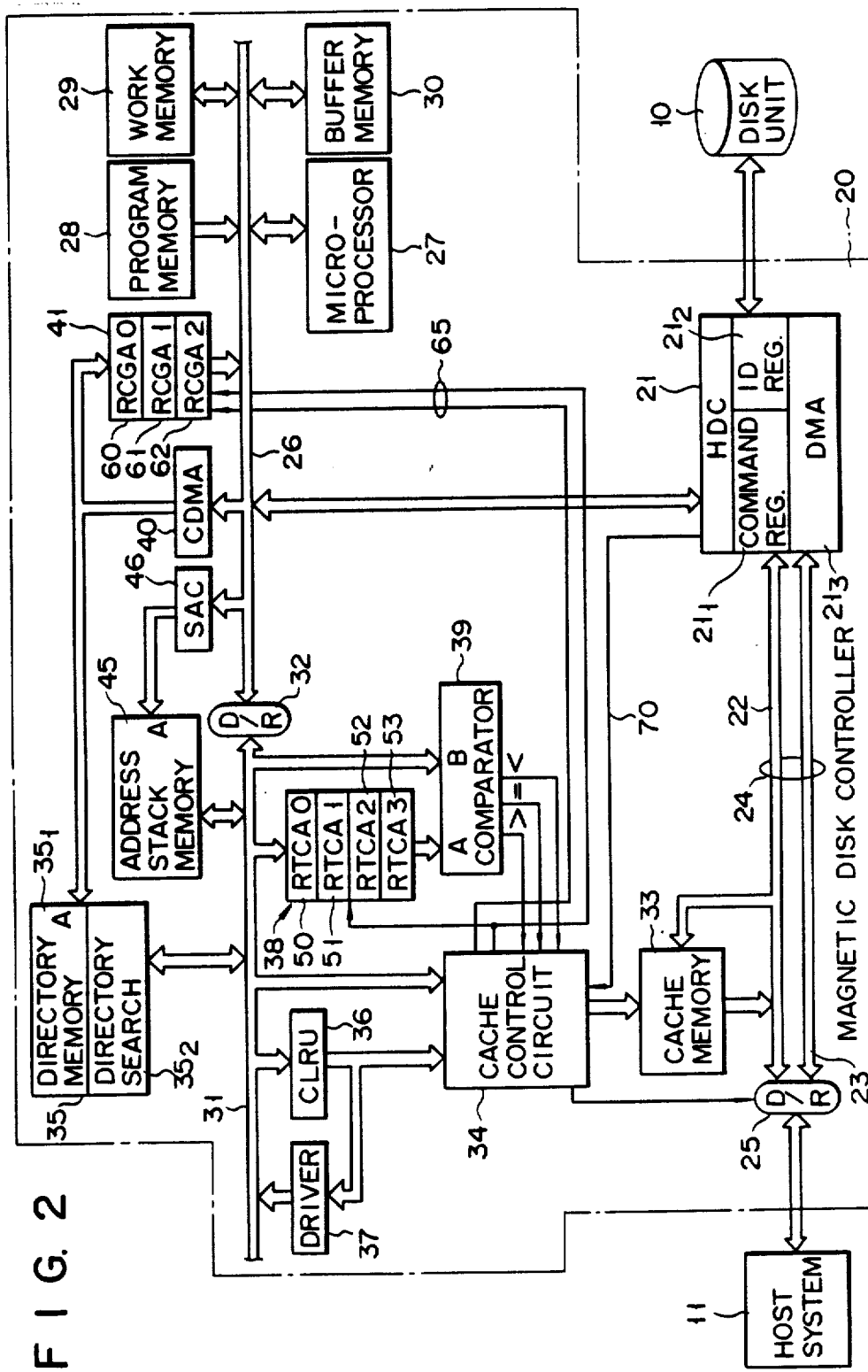
FIG. 2 is a block diagram showing an embodiment of a magnetic disk controller incorporating a disk cache memory according to the present invention.

FIG. 2 is a block diagram showing an embodiment of magnetic disk controller 20 incorporating a disk cache system. Hard disk control circuit (to be referred to as an HDC hereinafter) 21 for controlling disk unit 10 is connected to host system 11 through first bus 24, which consists of data line 22 and control line 23, and driver/receiver (to be referred to as a D/R hereinafter) 25. HDC 21 is also connected to second bus 26. HDC 21 consists of command register $21_1$, ID register $21_2$, and DMA $21_3$. Bus 26 is also connected to microprocessor 27 for controlling the overall operation of controller 20, program memory 28 storing control programs (microprograms) for microprocessor 27, work memory 29 used as a work area of microprocessor 27, and buffer memory 30 for compensating a difference between the transfer rates of disk unit 10 and host system 11. Third bus 31 is connected to cache control circuit 34, mainly for controlling data transfer, the operation of which includes control of cache memory 33, directory memory/search circuit 35 consisting of directory memory $35_1$ and directory search circuit $35_2$, and address stack memory 45. Memory 45 is a FIFO (first-in first-out) stack for storing cache operation designation data consisting of three parameters. These three parameters are transfer start cache address a, the number of transfer sectors l, and data transfer direction control code C. The output of stack address counter 46 is connected to address port A of address stack memory 45. Bus 26 is connected to the input of counter 46.

Bus 31 is connected to the input to LRU counter (referred to as an CLRU hereinafter) 36 for storing a LRU value read out from memory $35_1$ in the directory search mode, as well as the output of driver 37. The output of CLRU 36 and the input of driver 37 are connected to cache control circuit 34. Bus 31 is also connected to the input port of register file 38 and the B input of comparator 39. The A input of comparator 39 receives the data from bus 31. The output port of comparator 39 is connected to control circuit 34. Control circuit 34 is connected to register file 38 to control inputs thereto, i.e., the CLRU 36 contents (LRU values) output by driver 37 on bus 31. File 38 comprises four registers 50 through 53, i.e., RTCA0 through RTCA3.

The output of directory memory address counter (to be referred to as a CDMA hereinafter) 40 is connected to address port A of directory memory $35_1$ to designate the addresses of memory $35_1$. The input of CDMA 40 is connected to second bus 26. The output of CDMA 40 is connected to the input of register file 41. The output of file 41 is also connected to bus 26. File 41 is connected through control line 65 so as to receive control signals from cache control circuit 34. Register file 41 consists of three registers 60 through 62, i.e., RCGA0 through RCGA2.

Figure 1:
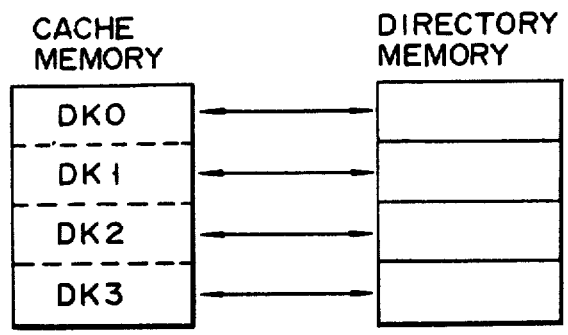
FIG. 1 is a schematic view showing the correspondence between a cache memory and a directory memory in a conventional system.
Figure 3:
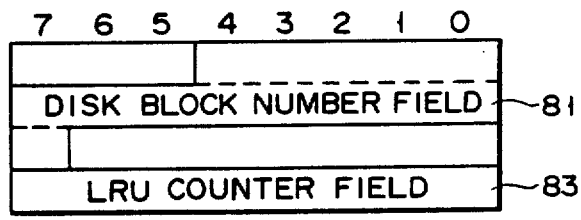
FIG. 3 is a format showing an entry structure of a directory memory in FIG. 2.

Each entry of directory memory $35_1$ includes disk block number field (8 bits) 81 representing the number of data blocks registered in cache memory 33, and LRU counter field (8 bits) 83 representing an LRU value, as shown in FIG. 3. The number of entries in memory $35_1$ is equal to that of the cache blocks in cache memory 33. In this embodiment, 16 entries are given for each column. One track of disk unit 10 consists of 64 sectors, each corresponding to one block of cache memory 33. The area of disk unit 10 is divided into column 0 and column 1 which store data in units of 64 sectors. A column value is represented by the seventh bit from the LSB of a disk logical address (to be described later). The disk block number is represented by the MSB excluding the lower seven bits of the disk logical address.

The magnetic disk controller of this embodiment has the following features:
(i) One sector of the magnetic disk consists of 256 bytes.
(ii) One block (cache block) of cache memory 33 consists of 16 K bytes (64 sectors) and therefore one block (disk block) of the disk consists of 16 K bytes (64 sectors).
(iii) A mapping scheme of cache memory 33 is a set associative scheme.
(iv) A cache block replacement scheme is an LRU scheme.
(v) The number of levels (i.e., the number of entries) of directory memory $35_1$ is 16 per column.
(vi) The capacity of cache memory 33 is 512 Kbytes.

The operation of the embodiment shown in FIG. 2 will be described below.

Figure 4:
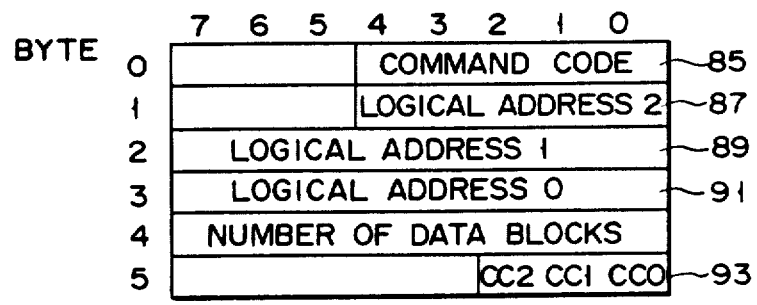
FIG. 4 is a format of a read/write command used in the system of FIG. 2.

A read/write command from host system 11 is stored in command register $21_1$ in HDC 21 through D/R 25 and bus 24. The read/write command is a 6-byte instruction including command code 85 for designating read/write operation or the like, a disk logical address consisting of logical address 2 (MSB) 87, logical address 1 89, and logical address 0 (LSB) 91, the number of data blocks, and each field 93 of cache control bits CC2 through CC0 (FIG. 4).

The read/write command in register $21_1$ is read out by microprocessor 27 and stored in a predetermined area of work memory 29. When microprocessor 27 stores the read/write command from host system 11 in memory 29, microprocessor 27 issues a seek command which is then set in command register $21_1$ in HDC 21. HDC 21 controls disk unit 10 to seek a specified track. Microprocessor 27 also sets, in accordance with the read/write command, a disk block number corresponding to the access area of disk unit 10, and an LRU value of "0" in register file 38 through bus 26, D/R 32, and bus 31. Microprocessor 27 sets bit 6 of logical address 0 (FIG. 4), i.e., the start address of the currently read-accessed entry in each area (for 16 entries) in directory memory $35_1$, in CDMA 40. In this case, each area is accessed by the column value. The following directory search cycle is repeated 16 times.

In the directory search cycle, the address specified by CDMA 40 is set in RCGA0 60 in register file 41. Therefore, the start position of the entry currently searched is always stored in RCGA0 60 in register file 41.

CDMA 40 is sequentially counted up. Directory data of the entry in directory memory $35_1$ is read out onto bus 31 in units of bytes in response to the count from the CDMA 40. The readout directory data is supplied to the B input of comparator 39. Byte data from register file 38 is supplied to the A input of comparator 39 in response to the data supplied to the B input. Comparator 39 compares the contents of the A and B inputs.

The comparison result of comparator 39, i.e., the result of comparison of the target data block number from file 38 with the registered data block number from memory $35_1$ in units of bytes, is supplied to cache control circuit 34. The result of the comparison between the LRU value from file 38 and that from memory $35_1$ is also supplied to cache control circuit 34. The LRU value supplied from memory $35_1$ to the B input of comparator 39 through bus 31 is supplied to CLRU 36. The LRU value stored in CLRU 36 is incremented by one.

Cache control circuit 34 determines if a cache hit occurs according to the data block number comparison result from comparator 39. If circuit 34 determines that coincidence is detected by comparator 39 and a cache hit occurs, it appends a cache hit flag to the address set in RCGA0 60 in register file 41, i.e., to the address representing the start position of the entry being searched in the current directory search cycle. The address with a cache hit flag is set in RCGA1 61 in register file 41. Cache control circuit 34 determines the entry of directory memory $35_1$ which corresponds to the cache block to be replaced at this time, according to the LRU value comparison result. More specifically, if the LRU value from memory $35_1$ exceeds that stored in file 38, cache control circuit 34 determines that the cache block corresponding to the entry is a candidacy of block to be replaced. Control circuit 34 transfers the address from RCGA0 60 in file 41 to RCGA2 62 therein. Control circuit 34 causes driver 37 to send the incremented LRU value from CLRU 36 onto bus 31. The LRU value in register file 38 is then updated to correspond with that appearing on bus 31. Cache control circuit 34 also writes the LRU value stored in CLRU 36 via bus 31 in the corresponding entry in directory memory $35_1$, regardless of the comparison result of comparator 39. In this embodiment, the LRU value in the corresponding entry in memory $35_1$ is incremented by one for each directory search cycle.

The above operation is the directory search cycle. This cycle is repeated 16 times to complete the directory search corresponding to the given read/write command. In this case, if a cache hit is detected, the start address of the entry in memory $35_1$ which corresponds to the hit cache block is set in RCGA1 61 in register file 41. The start address of the entry in memory $35_1$ which has the largest LRU value in the specified column is stored in RCGA2 62.

When the directory search is completed, microprocessor 27 fetches the content of RCGA1 61 in file 41 through bus 26, and checks the flag mentioned above in RCGA1 61 whether cache hit or miss occurs. If microprocessor 27 detects a cache hit, the LRU value in the entry in memory $35_1$ which is specified by the content (directory address) of RCGA1 61 in file 41 is initialized (or re-registered). However, if the read mode is specified, even if a cache miss is detected, the LRU value in the entry in memory $35_1$ which is specified by the content of RCGA2 62 in file 41 is initialized (or re-registered).

In initialization (or re-registration) of the LRU value, microprocessor 27 retrieves the read/write command sent from host system 11 and retained in buffer memory 30. Microprocessor 27 checks if cache control bit CC2 among bits CC2 through CC0 is "0". If CC2 = "0", then CC1 and CC2 are defined as LRU setting data. In this case, CC1 and CC2 are shifted to the left by 6 bits to prepare an LRU setting value "CC1 (MSB), CC0, 0, 0, 0, 0, 0, 0 (LSB)", as shown in FIG. 5. The same LRU setting value is supplied to directory memory $35_1$ through bus 26, D/R 32, and bus 31, and is registered in LRU counter field 83 of the entry in memory $35_1$. In LRU value comparison and setting performed by CLRU 36 in the next directory search, the updated LRU setting value is used. If CC1 and CC0 are set to be "1", the resident period of the data block in cache memory 33 can be decreased. However, if CC1 and CC0 are set to be "0", the period can be increased.

FIGS. 6 through 12 show another embodiment of a disk cache system wherein the number of write cycles for the disk can be decreased without using an expensive power source, thereby improving system performance.

FIG. 6 shows a format of directory data stored in directory memory $35_1$.

Directory data set in each entry in directory memory $35_1$ consists of a cache active bit representing whether the content of a block (cache block) in cache memory 33 for a corresponding entry is effective or not, a write command receiving bit representing whether the write data specified by host system 11 is completely written in disk unit 10 or not, a resident bit representing whether replacement of the cache block corresponding to this entry is inhibited, a disk address (disk block address) of a data block (disk block) stored in cache memory 33, and a replacement counter (replacement counter value) used for replacement operation.

FIG. 7 shows a format of a disk write instruction sent from host system 11 to disk controller 20. The write instruction includes a specified write instruction designation bit for determining whether the write instruction is the specified write instruction which allows data write in cache memory 33 but does not require data write in disk unit 10 when cache hit is detected in the disk write request mode.

FIG. 8 shows a format of a disk read instruction sent from host system 11 to disk controller 20. The read instruction includes a resident designation bit for designating setting/resetting of a resident bit of an entry (called the replacement entry) in memory $35_1$ which corresponds to the cache block (subjected to replacement) in cache memory 33 when a cache miss is detected in the disk read request mode.

The operation of the system described above will be described below. The operation will be explained with reference to the flow chart of FIG. 9 wherein a disk write instruction is sent from host system 11 to disk controller 20.

Figure 10:
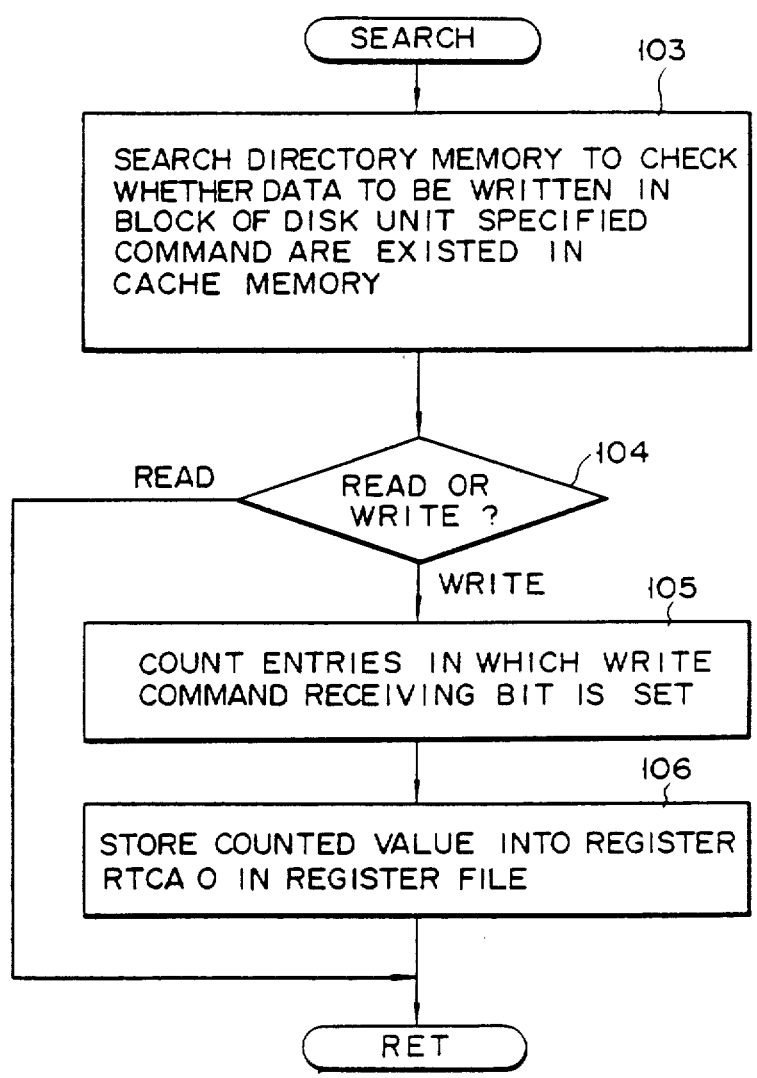

When the disk write instruction is sent from host system 11 to disk controller 20, controller 20 searches directory memory $35_1$ (step 101). In the search step, as shown in FIG. 10, microprocessor 27 checks whether data to be written in the block of disk unit 10 specified by the instruction exists in cache memory 33 (step 103). In the case of a write command (step 104), the number of entries whose write command receiving bits are set is counted (step 105). The count from the replacement counter is stored in RTCA0 register 50 in register file 38 (step 106).

Figure 9:
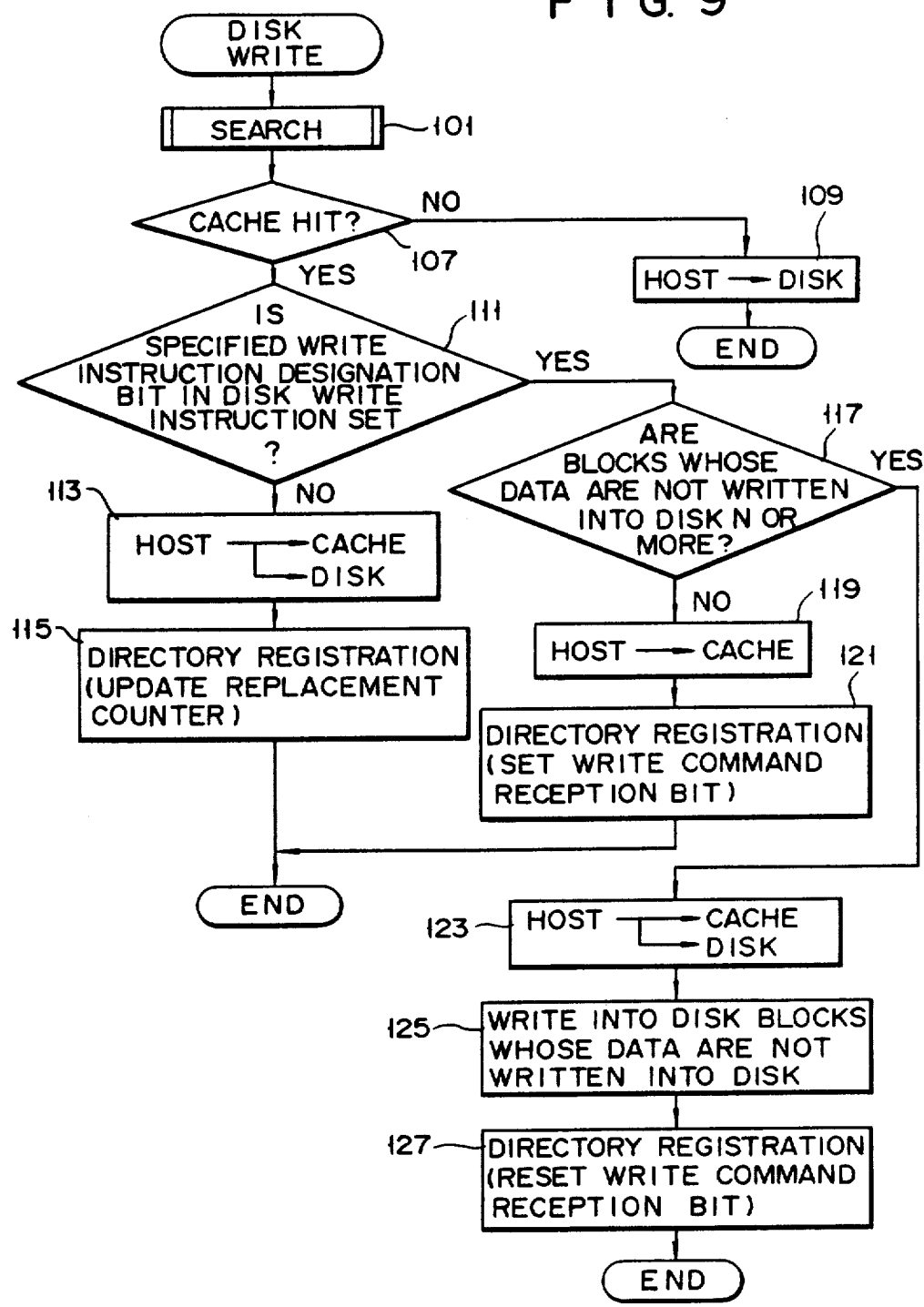

In step 107 of FIG. 9, if microprocessor 27 detects a cache miss, controller 20 writes the write data from host system 11 directly in disk unit 10 (step 109), and the flow is ended. However, if the result of step 107 is YES, disk controller 20 checks if the specified write instruction designation bit in the disk write instruction from host system 11 is set, i.e., if the disk write instruction is the specified write instruction (step 111).

If the result of step 111 is NO, controller 20 writes the write data from host system 11 in cache memory 33 and the disk unit 10 (step 113). Controller 20 then updates the replacement counter in the bit entry in directory memory $35_1$ (step 115), and the flow is ended.

However, if the result of step 111 is YES, controller 20 retrieves the contents of RTCA0 50 to check if there are N or more entries whose write command receiving bits are set, i.e., if there are N or more blocks which have been written in cache memory 33 but not yet in disk unit 10 (step 117).

If the result of step 117 is NO, controller 20 writes the write data from host system 11 in cache memory 33, but does not write it in disk unit 10 (step 119). Controller 20 sets the write command receiving bit in the hit entry in directory memory $35_1$ (step 121), and the flow is ended.

However, if the number of blocks whose data are not written in unit 10 is N or more, controller 20 writes the write data from host system 11 in cache memory 33 and in disk unit 10 (step 123). Controller 20 writes certain of the blocks not written in disk unit 10 in memory 33, i.e., those, which correspond to the directory memory $35_1$ entries whose write command receiving bits are set (step 125). In this case, the number of blocks to be written in unit 10 is determined to be smaller than N (e.g., N −2). The operation in step 125 is performed such that the number of blocks not written in disk unit 10 is smaller than the maximum number N of blocks to be written in disk unit 10 in a back-up operation mode, i.e., at the time of power failure. Controller 20 then resets the write command receiving bits of directory memory $35_1$ entries corresponding to the cache blocks written in unit 10 (step 127), and the flow is ended.

In the embodiment as described above, if the cache hit is detected in the case of the disk write instruction whose specified write instruction designation bit is set, the corresponding write data is registered in cache memory 33 but not in disk unit 10, thereby decreasing the write cycles of the disk unit 10. The number of blocks written in cache memory 33 but not in unit 10 is controlled to be smaller than N. At the time of power failure, the blocks not written in unit 10 are then written therein (to be described later).

Figure 11:
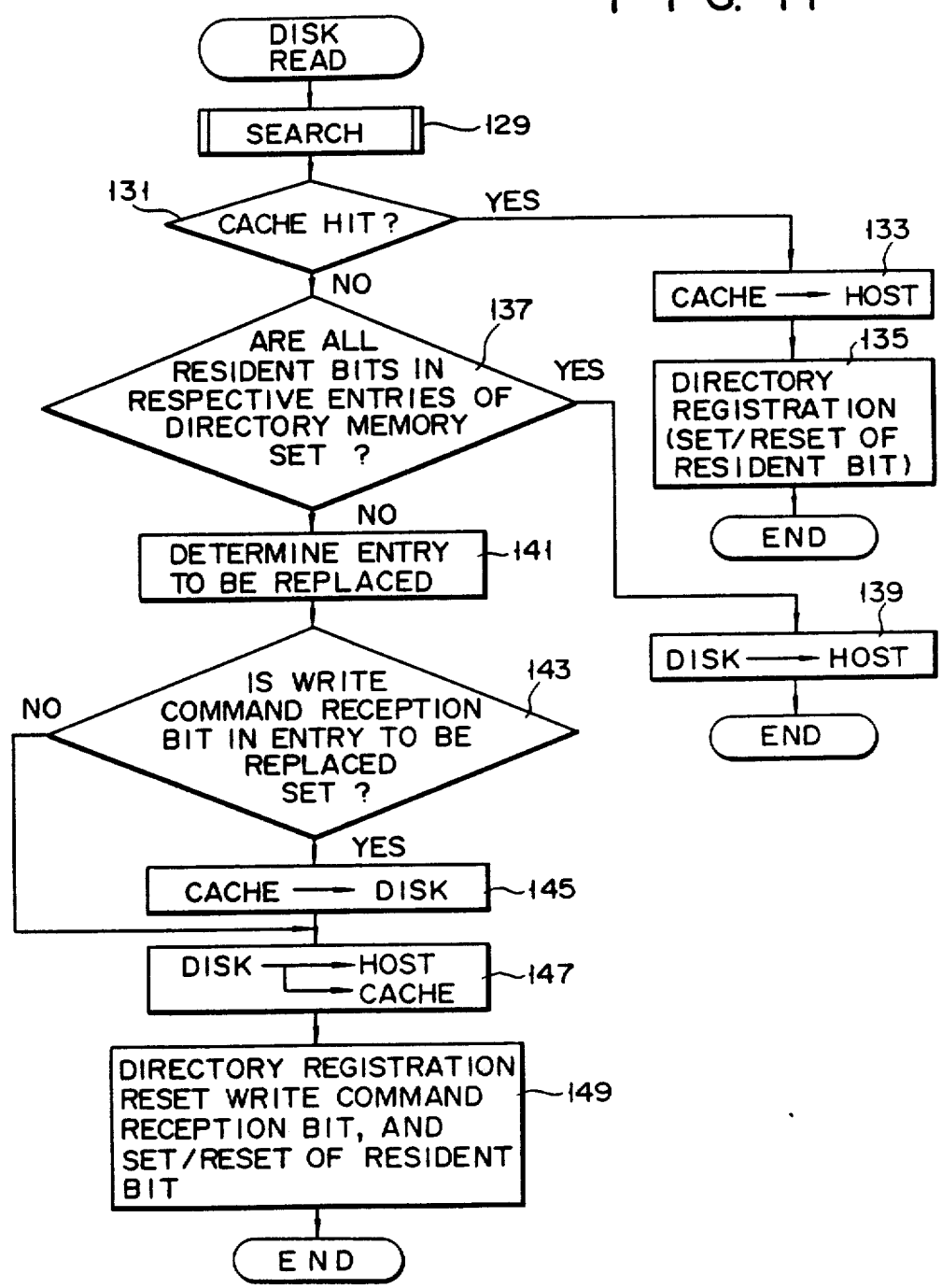

An operation will be described with reference to the flow chart in FIG. 11, wherein a disk read instruction is sent from host system 11 to disk controller 20.

When the disk read instruction is sent from system 11 to controller 20, controller 20 searches directory memory $35_1$ (step 129) to check if the data in unit 10 specified by the instruction exists in cache memory 33, i.e., if a cache hit is detected (step 131).

If the result of step 131 is YES, controller 20 reads out the target data from the cache block in cache memory 33 so as to correspond to the hit entry in directory memory $35_1$. The readout data is sent to host system 11 (step 133). Controller 20 sets or resets the resident bit of the hit entry in memory $35_1$ according to the content of the resident designation bit of the disk read instruction (step 135), and the flow is ended. The replacement counter area in each hit entry is updated in step 135.

However, if the result of step 131 is NO, controller 20 checks if all resident bits of the entries in directory memory $35_1$ are set (step 137).

If the result of step 137 is YES, controller 20 determines that no cache blocks to be replaced exist and transfers the read data from unit 10 only to host system 11 (step 139). In this case, the read data is not written in cache memory 33.

However, if there is even one directory memory entry whose resident bit is not set, controller 20 determines the entry to be replaced according to the LRU algorithm (i.e., the content of the replacement counter) (step 141). The cache block corresponding to this entry is detected as the cache block to be replaced. Subsequently, disk controller 20 checks if the write command receiving bit of the entry to be replaced is set (step 143).

If the result of step 143 is YES, controller 20 writes the cache block corresponding to this entry, i.e., the data of the cache block to be replaced, in disk unit 10 (step 145). Controller 20 then transfers read data from unit 10 (specified by the disk read instruction from host system 11) to host system 11 and performs a data write in the cache block data to be replaced (step 147). Controller 20 sets a disk block address and the initial value for the replacement counter in the entry (the entry to be replaced) in directory memory $35_1$ which specifies the cache block. At the same time, controller 20 resets the write command receiving bit and sets or resets the resident bit according to the content of the resident designation bit of the disk read instruction from host system 11 (step 149).

The cache block corresponding to the directory memory $35_1$ entry whose resident designation bit is set in step 149 is excluded from the blocks subjected to replacement. This block data, i.e., the data of the disk block specified by the disk read instruction resides in cache memory 33 at least until the resident bit is reset (i.e., until resident cancel of the cache block data) in response to the resident designation bit in the disk read instruction. The disk block residence can be specified in response to the resident designation bit of the disk read instruction, or can be performed with software. This operation is used for high-speed jobs, thereby improving overall system performance.

An operation at the time of power failure will be described with reference to the flow chart in FIG. 12.

Power failure is detected by a cutoff detector (not shown). A power source used in this embodiment is designed to be operated for a predetermined period of time, called a backup period, after the cutoff detector detects a power failure. During this back-up period, disk controller 20 performs the following operation. If the cutoff detector detects a power failure, controller 20 interrupts the currently executed process; and (step 151). Controller 20 accesses directory memory $35_1$ and sequentially writes cache block data (cache block data not written in disk unit 10) corresponding to the entry whose write command receiving bit is set (step 153).

In this embodiment, the number of cache blocks corresponding to the entries whose write command receiving bits are set is smaller than the maximum number N of blocks to be written in unit 10 during the back-up period after the power failure. Therefore, all block data not written in unit 10 can be properly written therein, in step 153. At the time of system initialization after the power failure, data can be read from unit 10 without read errors. In this embodiment, it is possible to provide most of the non-written blocks as continuous resident blocks in the disk area upon resident designation of the disk write instruction. This indicates that a high-speed write of non-written blocks in unit 10 can be performed and the N value can be increased.

Still another embodiment for effectively performing data transfer control in the case of read errors will be described with reference to FIG. 2 and FIGS. 13A through 15.

The disk access request from host system 11 is held in command register $21_1$ in HDC 21 through D/R 25 and bus 24. This request is read out by microprocessor 27 and stored in a predetermined area of work memory 29. At the same time, microprocessor 27 supplies a seek command to HDC 21. HDC 21 controls disk unit 10 to seek a track specified by the seek command. Microprocessor 27 supplies the disk block number corresponding to the disk unit area subjected to data access and the directory memory address to directory search circuit $35_2$ through bus 26, D/R 32, and bus 31. Microprocessor 27 initializes circuit $35_2$. Search circuit 352 performs a directory search using the disk block number as the target. The directory search result is held in directory memory/ search circuit 35.

Microprocessor 27 produces at least one cache operation designation data according to the disk block number held in directory memory/search circuit 35 and the contents of the disk access request. The produced data is stored in address stack memory 45 through bus 26, D/R 32 and bus 31.

Data transfer direction control code C in the cache operation designation data represents five modes of operation. These five modes will be described with reference to FIGS. 13A through 13E.

(i) C=1

Figure 13A:
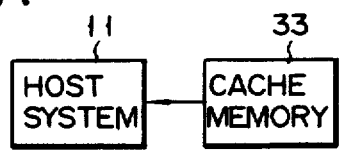
FIGS. 13A through 13E are views for explaining the operation contents of data transfer direction control code C used in the magnetic disk controller according to the present invention.

This is used for a cache hit in the disk read request mode. In this case, the contents of cache memory 33 are transferred to host system 11, and disk unit 10 is not accessed, as shown in FIG. 13A.

(ii) C=2

Figure 13B:
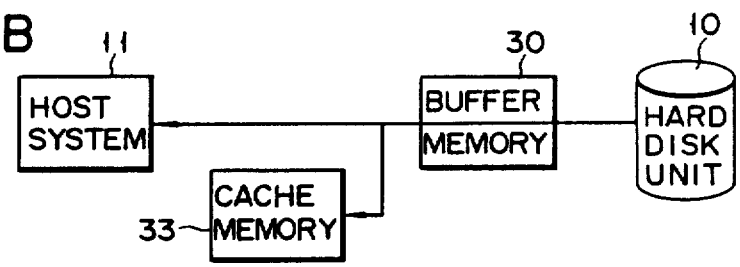

This is used for a cache miss in the disk read request mode. As shown in FIG. 13B, disk unit 10 is read-accessed, and the readout data is transferred to host system 11 through buffer memory 30 and, at the same time, is written in cache memory 33.

(iii) C=3

Figure 13C:
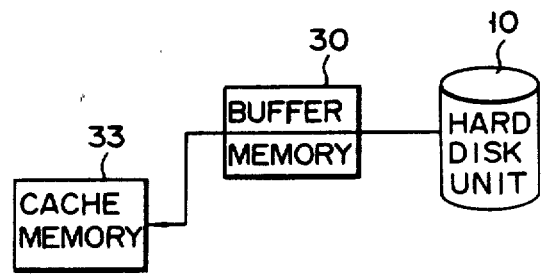

This is used for a cache miss in the disk read request mode and a sector is not requested by the host system but exists in the cache block (undesired sectors may often be written since a write operation is performed in units of blocks). As shown in FIG. 13C, the read data is written in cache memory 33 but is not transferred to host system 11.

(iv) C=4

Figure 13D:
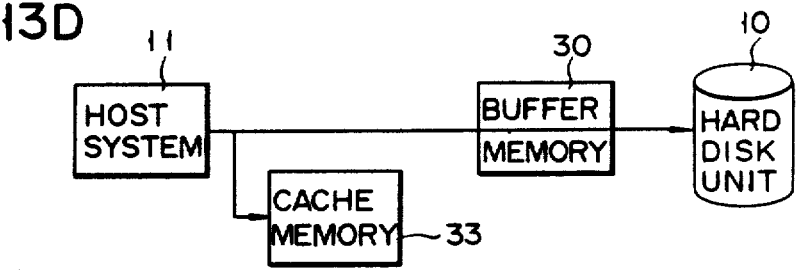
Figure 13E:
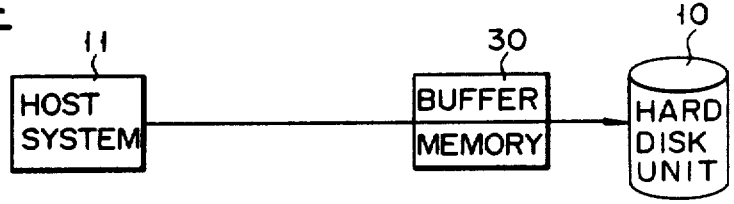

This is used for a cache hit in the disk write request mode. As shown in FIG. 13D, the write data from host system 11 is transferred to disk unit 10 through buffer memory 30 and, at the same time, is written in cache memory 33.

(v) C=5

This is used for a cache miss in the disk write request mode. The data from host system 11 is written in only disk unit 10 through buffer memory 30, but not in cache memory 33.

The production of cache operation designation data will be described below. Assume that a disk access request from host system 11 represents disk read for 6 sectors starting from sector number 10, and that a cache miss occurs during the disk read. Also assume that one track of the disk consists of 64 sectors (sector 0 through sector 63), and that one block of cache memory 33 consists of 64 sectors.

When microprocessor 27 detects the cache miss in the read operation according to the directory search result of directory memory/search circuit 35, microprocessor 27 read-accesses the ID field of the disk. The readout data is latched in ID register $21_2$ in HDC 21 to read the sector number from the ID field.

Microprocessor 27 subdivides the updating cache block into subunits by use of cache addresses each corresponding to the sector next to that of the read sector number, the start sector of the disk area subjected to transfer to the host system, and the end sector. Cache operation designation data are prepared for the respective subunits. Assuming that the read sector number is 4, the cache block is subdivided into subunit A corresponding to the disk area of sector numbers 0 through 4, subunit B of sector numbers 5 through 9, subunit C of sector numbers 10 through 15, and subunit D of sector numbers 16 through 63. When data is read from sector number 5, i.e., when the data transfer is performed in an order of B, C, D, and A, effective data transfer without awaiting disk rotation can be achieved.

Figure 14:
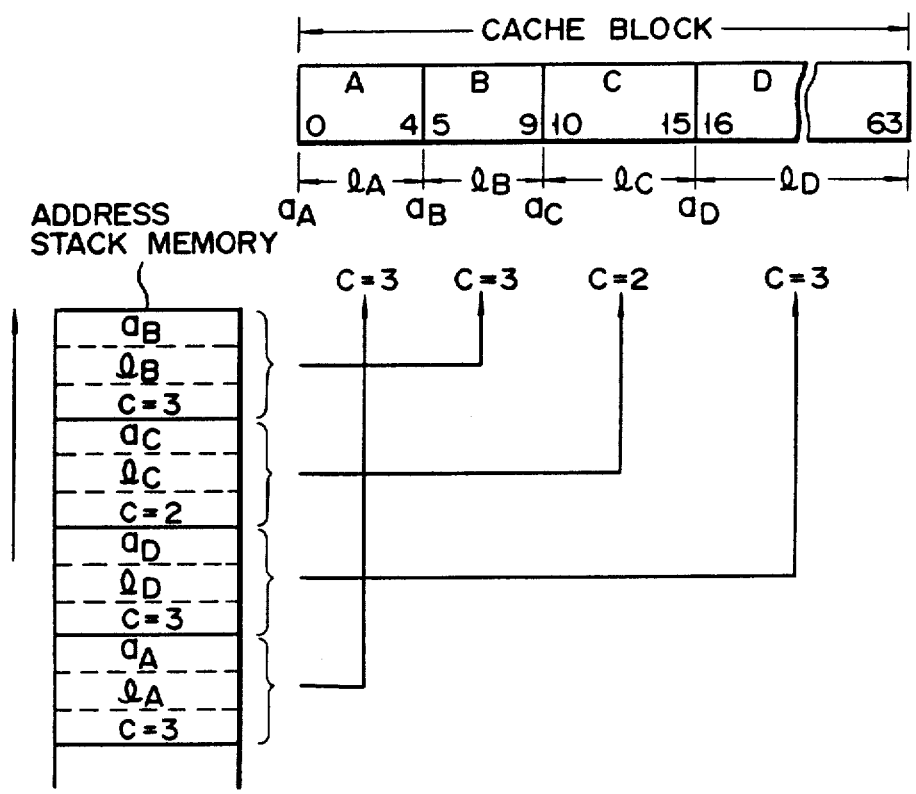
FIG. 14 is a chart for explaining cache operation designation data produced upon occurrence of a read error.

The cache block shown in FIG. 14 shows one block in cache memory 33. The cache block is logically subdivided into subunits A, B, C, and D. i.e., the cache block itself is not physically divided into subunits. Numeric values 0 to 63 represent the disk sector numbers. Data of disk sector numbers 5 to 9, for example, is written in subunit B starting with address aB.

Microprocessor 27 first produces cache operation designation data for subunit B and pushes down the data in address stack memory 45 through bus 26, D/R 32, and bus 31. As shown in FIG. 14, the cache operation designation data for subunit B consists of transfer start cache address aB for subunit B, the number lB of transfer sectors, and the data transfer direction control code (C=3).

Microprocessor 27 then produces cache operation designation data for subunit C and pushes it down in address stack memory 45. The cache operation designation data for subunit C consists of transfer start cache address aC, the number lC of transfer sectors, and the data transfer direction control code (C=2), as shown in FIG. 14.

Subsequently, microprocessor 27 produces cache operation designation data for subunit D and pushes it down in memory 45. The cache operation designation data for subunit D consists of transfer start cache address aD, the number lD of transfer sectors, and the data transfer direction control code (C=3), as shown in FIG. 14.

Finally, microprocessor 27 produces cache operation designation data for subunit A and pushes it down in memory 45. The cache operation designation data for subunit A consists of transfer start cache address aA, the number lA of transfer sectors, and the data transfer direction control code (C=3), as shown in FIG. 14.

When microprocessor 27 completes production of the cache operation designation data and its storage in address stack memory 45, microprocessor 27 sends a control signal to HDC 21 to designate a disk read of 59 sectors starting from sector number 5, i.e., the disk read from the start sector of the disk area corresponding to subunit B to the last sector of the corresponding track. Microprocessor 27 sets the start address for address stack memory 45 in stack address counter 46, and starts cache control circuit 34.

HDC 21 receives the disk read command from microprocessor 27 and data of the specified area from disk unit 10 and stores them in buffer memory 30 through bus 26. When disk read data of one or more sectors is buffered in memory 30, DMA $21_3$ in HDC 21 sends a data transfer request to host system 11 through control line 23, and, at the same tie, a data transfer request to cache control circuit 34. When DMA $21_3$ receives the response signals from host system 11 and cache control circuit 34, it reads the data from buffer memory 30 and sends it onto data line 22. This read operation is time-divisionally performed with storage in memory 30.

When cache control circuit 34 is initialized by microprocessor 27, circuit 34 reads the specified data from the area (corresponding to subunit B of FIG. 14) of memory 45 which is accessed by stack address counter 46. Cache control circuit 34 sends address and write signals to cache memory 33, and sequentially writes data output from DMA $21_3$ on line 22 in the specified area of memory 33 in synchronism with data transfer by DMA $21_3$. In this case, cache control circuit 34 controls D/R 25 to inhibit data transfer to host system 11 via line 22.

When cache control circuit 34 completes the data write for subunit B, it controls stack address counter (SAC) 46. In other words, when address aB is updated by address (B, SAC 46 is incremented by one. The next cache operation designation data, i.e., that for subunit C, is read from address stack memory 45 and the designated control is performed. More specifically, the data sequentially sent from DMA $21_3$ onto line 22 are sequentially written in subunit C of the cache memory 33. At the same time, D/R 25 is controlled to transfer data from line 22 to system 11. When the data write of subunit C is completed, cache control circuit 34 performs control specified by the next cache operation designation data, i.e., the cache operation designation data for subunit D. Control circuit 34 writes data from line 22 in the designated subunit D of cache memory 33 and, at the same time, controls D/R 25 to inhibit a write operation of data from line 22 to system 11.

Figure 15:
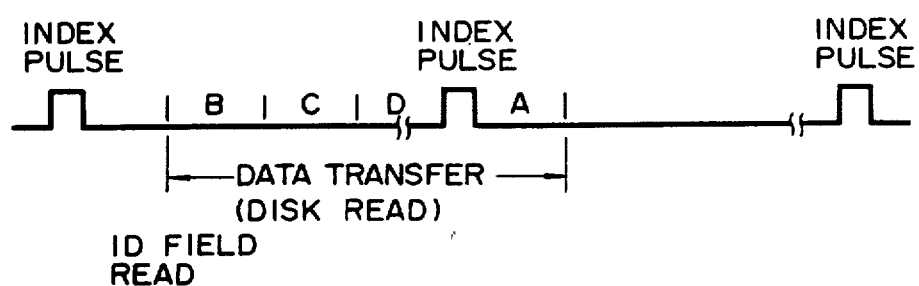
FIG. 15 is a timing chart for explaining the disk read operation in FIG. 14.

After HDC 21 completes the write operation for subunits B, C, and D, it detects an index pulse, as shown in FIG. 15, and then interrupts microprocessor 27. Upon detection of the interrupt from HDC 21, microprocessor 27 desigates a disk read operation for subunit A (sector 0 through sector 4). HDC 21 receives data of disk area corresponding to subunit A, and stores it in buffer memory 30. The data buffered in memory 30 is sent by DMA $21_3$ in HDC 21 onto line 22, and is written in subunit A of cache memory 33 under the control of cache control circuit 34. In this case, data transfer to system 11 via line 22 is inhibited.

In the embodiment shown in FIG. 14, the disk access request from host system 11 represents a cache miss in the disk read of 6 sectors, starting from sector number 10, and the current read sector number is 4.

Figure 16:
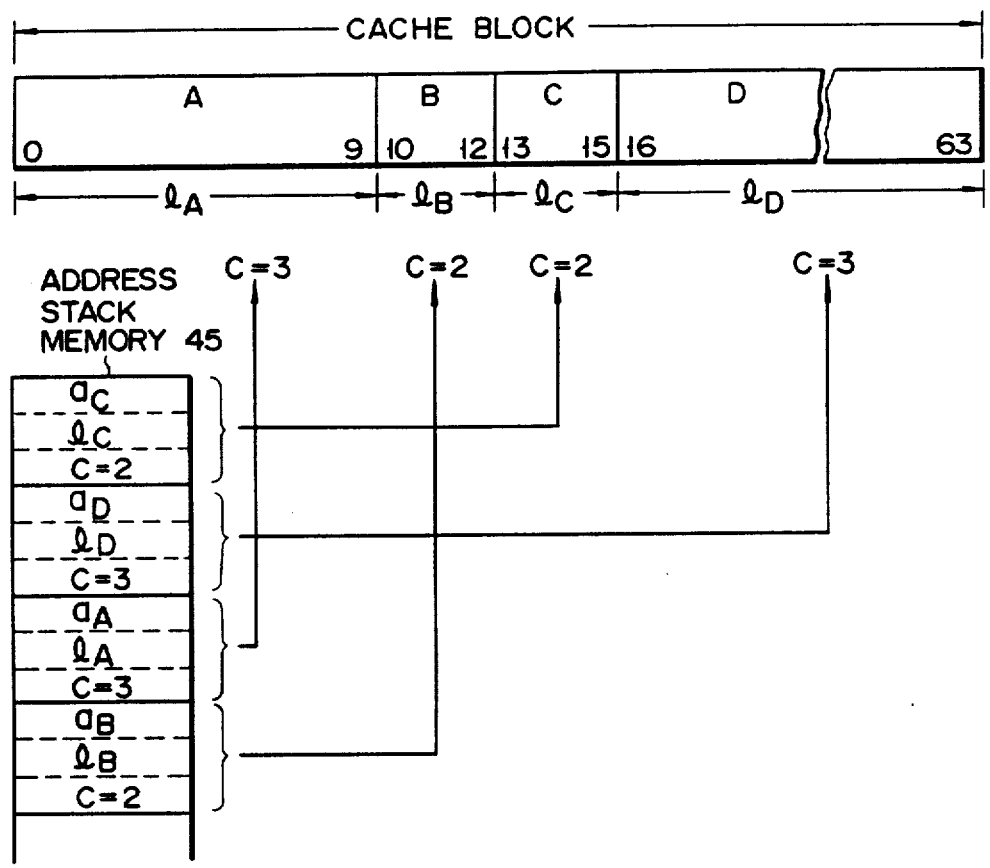
FIG. 16 is a chart for explaining another cache operation designation data.

In still another embodiment of the present invention, shown in FIG. 16, a disk access request from host system 11 represents a disk read of 6 sectors, starting from sector number 10, and the current read sector number is 12. In this case, the cache block is subdivided into subunit A corresponding to a disk area of sector numbers 0 through 9, subunit B corresponding to sector numbers 10 through 12, subunit C corresponding to sector numbers 13 through 15, and subunit D corresponding to sector numbers 16 through 63. In this case, if data is read from sector number 13, i.e., if the data transfer is performed in an order of C, D, A, and B, an effective data transfer without awaiting disk rotation can be achieved.

Microprocessor 27 first produces cache operation designation data for subunit C and pushes it down in address stack memory 45. Cache operation designation data for subunit C consists of transfer start cache address aC, the number lC of transfer sectors, and the data transfer direction control code (C =2).

Microprocessor 27 produces cache designation data for subunit D and pushes it down in address stack memory 45. This cache operation designation data consists of transfer start cache address aD, the number 1D of transfer sectors, and the data transfer direction control code (C =3).

Microprocessor 27 then produces cache operation designation data for subunit A and pushes it down in address stack memory 45. This cache operation designation data consists of transfer start cache address aA, the number 1A of transfer sectors, and the data transfer direction control code (C =3).

Finally, microprocessor 27 produces cache operation designation data for subunit B and pushes it down in address stack memory 45. This cache operation designation data consists of transfer start cache address aB, the number (B of transfer sectors, and the data transfer direction control code (C =2), as shown in FIG. 16.

Data can be read in an order of subunits C, D, A, and B under the control of cache control circuit 34, as in the embodiment of FIG. 14.

According to this embodiment, since data transfer control is performed according to the cache operation designation data consisting of the transfer start cache address, the number of transfer sectors, and the data transfer direction control code, data transfer can be effectively performed upon occurrence of a read error caused by storage of data not requested by the host system but written in the cache memory. In the disk read operation upon occurrence of the cache miss in the read operation, since data transfer is started with a read enable sector, disk rotation need not be awaited and high-speed transfer can be performed.

Figure 17:
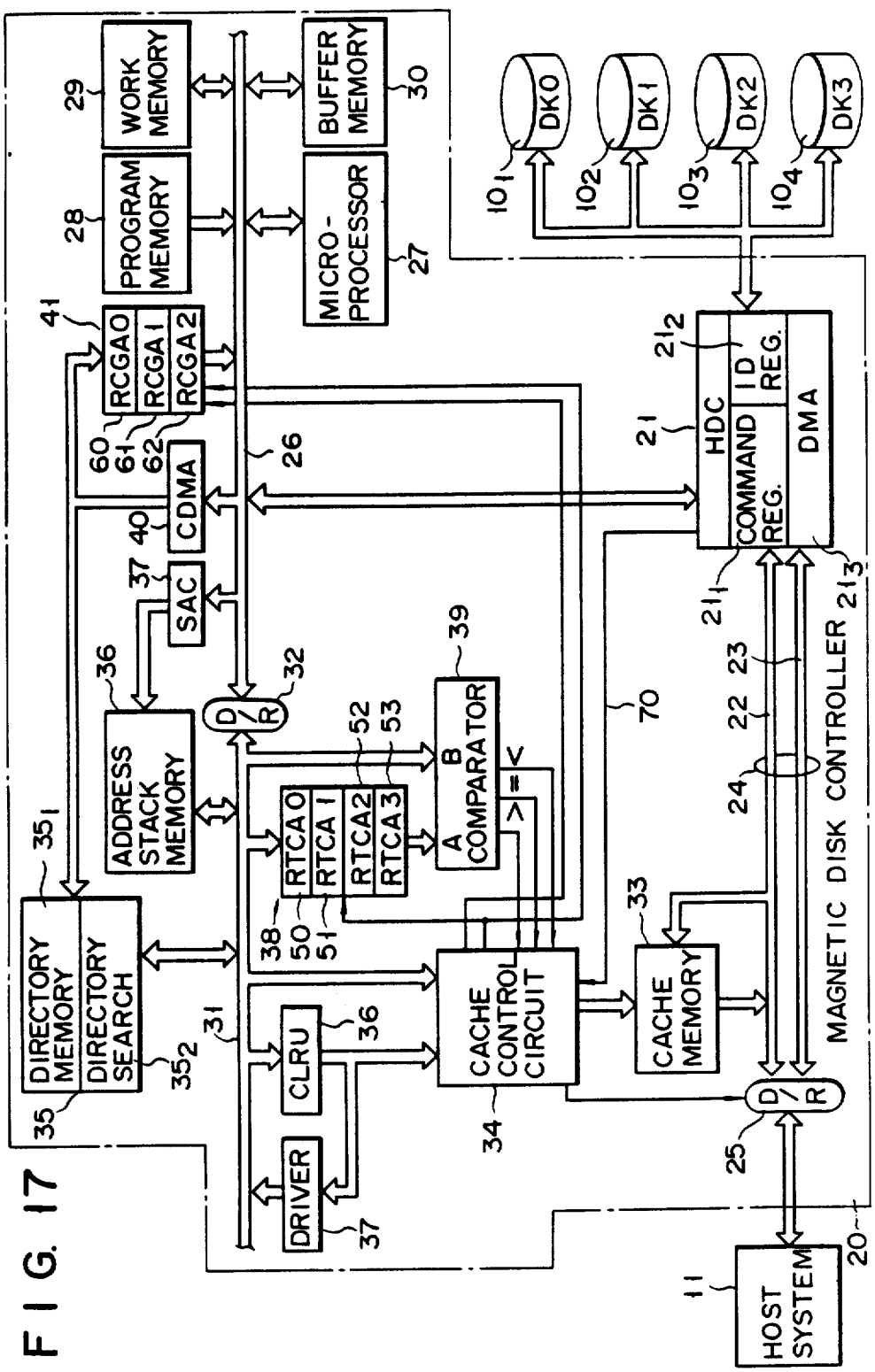
FIG. 17 is a block diagram showing another embodiment of a magnetic disk controller according to the present invention.

An embodiment of a magnetic disk controller for using a cache memory regardless of the number of magnetic disk units will be described below. The same reference numerals in the embodiment of FIG. 17 denote the same parts as in the embodiment of FIG. 2, and a detailed description thereof will be omitted. In the embodiment of FIG. 17, magnetic disk units $10_1$ through $10_4$ are connected to HDC 21.

Figure 18:
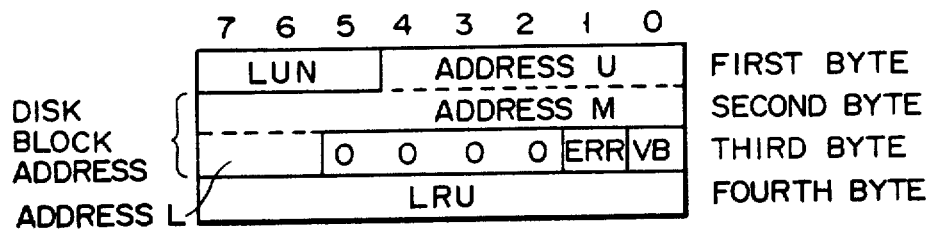
FIG. 18 is a format of directory data used in the embodiment of FIG. 17.

FIG. 18 shows a directory data format. The directory data is 4-byte data consisting of first to fourth bytes. The first byte consists of 3-bit drive number LUN (Logical Unit No.) as a magnetic disk drive identifier, and upper 5 bits (address U) of a 15-bit disk block address. The second byte consists of 8 bits (address M) of the disk block address which follow address U. The third byte consists of the remaining lower two bits (address L) of the disk block address, 4-bits of all "0" data, one-bit error flag ERR, and one-bit valid display flag VB. The fourth byte consists of an 8-bit LRU (Least Recently Used) value. The directory data is produced on the basis of drive number LUN, the disk logical address, etc., included in the read/write command.

Figure 19:
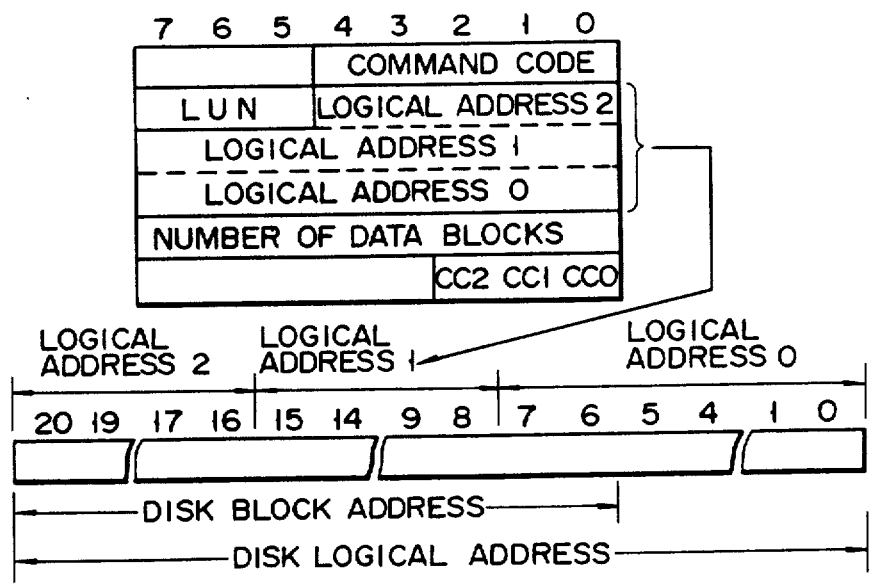
FIG. 19 is a format of a read/write command used in the embodiment of FIG. 17.

FIG. 19 shows a read/write command format. This command is a 6-byte instruction including a command code for designating the read/write operation, drive number LUN, the disk logical address, the number of data blocks, and cache control bits CC2 through CC0. Drive number LUN consists of three bits to access one of disk units $10_1$ through $10_4$. In this embodiment, the MSB of drive number LUN is always logic "0". The disk logical address represents a disk sector number designated by drive number LUN, and consists of a 5-bit logical address 2, 8-bit logical address 1, and 8-bit logical address 0, a total of 21 bits. In this embodiment, one block consists of 16 Kbytes. As shown in FIG. 19, bits 6 through 20 of the disk logical address represent a disk block address. In this embodiment, the capacity of cache memory 33 is 512 Kbytes, and one cache block consists of 16 Kbytes. The number of columns is 2, namely: column 0 and column 1. Each column of cache memory 33 includes 16 cache blocks. Therefore, bit 6 of the disk logical address represents the column number.

Figure 20:
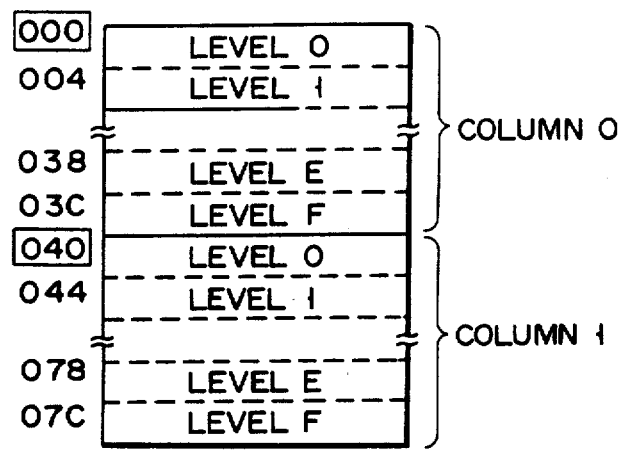
FIG. 20 is a data format of a directory memory used in the embodiment of FIG. 17.

FIG. 20 shows the structure of directory memory $35_1$. The capacity of memory $35_1$ is 128 bytes and consists of the column 0 area (64 bytes) starting with address 000 (hexadecimal), and the column 1 area (64 bytes) starting with address 040 (hexadecimal). The areas of columns 0 and 1 are subdivided into 16 areas (hereinafter, each called as to "level") each. Each level consists of 4 bytes. The directory data in FIG. 18 can be registered in each level.

The operation of the embodiment shown in FIG. 17 will be described below.

The read/write command (FIG. 19) from host system 11 is retained in command register $21_1$ in HDC 21 through D/R 25 and bus 24. This command is read out from register $21_1$ under the control of microprocessor 27, and is stored in a predetermined area of work memory 29. In this state, microprocessor 27 issues a seek command which is then set in HDC 21. HDC 21 controls a specified one of magnetic disk units $10_1$ through $10_4$ so as to seek the designated track.

Microprocessor 27 checks bit 6 (i.e., the column number) of the disk logical address, and checks if the disk block address including the disk logical address in the read/write command is registered in directory memory $35_1$. If bit 6 is set at logic "0", the column 0 area of directory memory $35_1$ serves as the area subjected a directory search. Microprocessor 27 sets "000"(hex) as the directory start address in CDMA 40.

However, if bit 6 is set at logic "1", the column 1 area of directory memory $35_1$ serves as the area subjected to a directory search. In this case, microprocessor 27 sets "040" (hex) in CDMA 40.

Microprocessor 27 sets drive number LUN and bits 16 through 20 (logical address 2) of the disk logical address in the read/write command in RTCA0 register 50 in register file 38. At the same time, microprocessor 27 sets bits 8 through 15 (logical address 1) of the disk logical address in RTCA1 register 51. Microprocessor 27 sets data consisting of bits 6 and 7 of the disk logical address, the 4-bit all "0" data, error flag ERR of logic "0", and valid display flag VB of logic "1" in RTCA2 register 52. Microprocessor 27 sets the LRU value (minimum LRU value) of 0 in RTCA3 register 53. Microprocessor 27 produces target data for directory search on the basis of drive number LUN and the disk logical address in the read/write command, and sets it in register file 38.

When the above-mentioned set-up is completed, microprocessor 27 causes cache control circuit 34 to perform directory search. The following directory search cycle is repeated 16 times.

In the directory search cycle, the directory memory address specified by CDMA 40 is set in RCGA0 register 60 in file 41. The directory data of a level represented by CDMA 40 is read out from memory $35_1$ from the first byte to the fourth byte onto bus 31. The readout byte data is supplied to the B input of comparator 39. In synchronism with the read operation described above, the target data is read out from file 38 from the first byte in units of bytes. The readout target data is supplied to the A input of comparator 39. Comparator 39 compares the contents of the A and B inputs. The comparison result is supplied from comparator 39 to cache control circuit 34. The LRU value in the directory data supplied from directory memory 35 to the B input of comparator 39 through bus 31 is then loaded in CLRU 36 and incremented by one.

Cache control circuit 34 determines if a cache hit occurs according to the comparison results for the first through third bytes in comparator 39. If a cache hit is detected, control circuit 34 adds a cache hit flag to the directory memory address set in RCGA0 register 60 in file 41, i.e., in the address representing the start position of the corresponding level of the current directory search cycle. The address with the cache hit flag is then set in RCGA1 register 61.

Cache control circuit 34 determines the level of memory 35 which corresponds to the candidacy of the cache block to be replaced at this time, according to the LRU value comparison result of comparator 39. If the LRU value from directory memory 35 exceeds that from register file 38, control circuit 34 determines that the cache block corresponding to the level is a cache block to be replaced. In this case, control circuit 34 transfers the directory memory address from RCGA0 register 60 in file 41 to RCGA2 register 62. Control circuit 34 causes driver 37 to send the unitary incremented LRU value specified by CLRU 36 onto bus 31, and updates the LRU value set in register 53 in file 38 to the LRU value on bus 31.

Cache control circuit 34 writes the LRU value of CLRU 36 on bus 31 in the corresponding level of directory memory 35, regardless of the comparison result of comparator 39. In this embodiment, the LRU value in the corresponding level in directory memory 35 is incremented by one for every directory search cycle.

The above operation is the directory search cycle. The cycle is repeated for the respective directory data of levels 0 through F (hexadecimal) in directory memory 35, thereby completing the directory search corresponding to the read/write command. In this case, a cache hit is detected and the start address of the level corresponding to the cache block is set in RCGA1 register 61 in file 41. The start address of the level having the largest LRU value in the specified column is stored in RCGA2 register 62 in file 41. This address represents the directory memory 35 level corresponding to the cache block to be replaced if a cache miss occurs in the read mode.

When the directory search is completed, microprocessor 27 fetches the content of RCGA1 register 61 in file 41 through bus 26, and checks the flag mentioned above if a cache hit or miss occurs. If a cache miss occurs in the read mode, microprocessor 27 writes the directory address of RCGA2 register 62 in file 41 as the oldest cache block at this time, i.e., the start address of the directory memory 35 level corresponding to the cache block to be replaced. This start address is set in CDMA 40. Microprocessor 27 registers the directory data in the level corresponding to directory memory 35 while the contents of CDMA 40 are sequentially counted. The directory data is substantially the same as the target data in register file 38, except that the LRU value is the initial value. In this embodiment, the initial value of the LRU value is specified by cache control bits CC2 through CC0.

Figure 21:
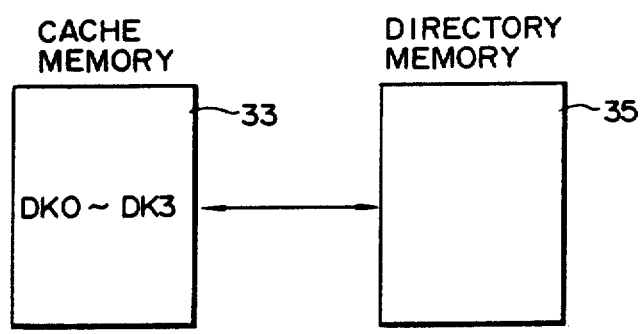
FIG. 21 is a schematic view showing the correspondence between cache memory 33 and directory memory $35_1$ in the embodiment of FIG. 17.

As is apparent from the above description, since the directory data includes drive number LUN representing the magnetic disk drive, the block of the cache memory 33 to be replaced for a disk block in the disk units of this embodiment can be determined according to the magnitudes of the LRU values of the directory data for each level in the same manner as in the magnetic disk controller for controlling the single magnetic disk unit. Therefore, unlike the conventional system, the area of directory memory 35 can be assigned to any one of units $10_1$ through $10_4$, as shown in FIG. 21. Thus, in this embodiment, cache memory 33 can be effectively utilized according to the access frequency of units $10_1$ through $10_4$.

In the embodiment of FIG. 17, cache memory 33 is commonly used by magnetic disk units $10_1$ through $10_4$. However, for a magnetic disk unit having a disk block such as an operating system which is loaded once, the cache memory need not be used. In this case, the cache memory is commonly used by other, remaining drive units. Thus, cache memory 33, having a limited capacity, can be effectively used, and the hit rate can be increased. Whether the cache memory is used is determined by a command at the time of system initialization in units of magnetic disk drive units.

The above embodiments exemplify the disk cache system for a magnetic disk. However, the present invention can also be applied to disk cache systems such as floppy disk drive units, optical disk systems or RAM disk units.

What is claimed is:

1. A magnetic disk controller incorporating a cache memory, comprising:

determining means for determining if data requested on the basis of a disk access request from a host system is stored in said cache memory;

cache operation designation data storage means for storing cache operation designation data consisting of a cache memory address, the number of transfer sectors, a data transfer direction, and data representing necessity or lack of necessity of data transfer to said host system;

sector number reading means for reading a sector number stored in an ID field of a current read sector when a read miss is determined by said determining means upon a disk access request from said host system;

cache operation designation data producing means for producing the cache operation designation data on the basis of contents of the disk access request from said host system and a determination result from said determining means, and for storing the cache operation designation data in said cache operation designation data storage means, said cache operation designation data producing means, in the case of a read miss, to produce the cache operation designation data for each one of a plurality of subunits of a cache block to be replaced according to a cache memory address corresponding to a sector adjacent to the sector whose number is ready by said sector number reading means, a cache address corresponding to a start sector of a disk area from which data is to be transferred to said host system, and a cache memory address corresponding to a last sector from which data is to be transferred to said host system; and to sequentially store the cache operation designation data corresponding to the subunits of said cache block in said cache operation designation data storage means, the cache operation designation data including, a cache memory address corresponding to the sector adjacent to the sector whose number is read by said reading means, said cache memory address serving as start cache operation designation data; and data transfer means for reading out the cache operation designation data from said cache operation designation data storage means in an order starting from the start cache operation designation data, and for performing data transfer operation on the basis of the readout data.

2. A controller according to claim 1, wherein the data representing the data transfer direction and the necessity or lack of necessity of data transfer to said host system presents five modes consisting of:

(i) a mode used for read hit, in which the contents of said cache memory are transferred to said host system and said magnetic disk unit is not accessed;

(ii) a mode for read miss, in which said magnetic disk unit is read-accessed, the read data is transferred to said host system and, at the same time, is written in said cache memory;

(iii) a mode for read miss, in which data of a disk area not accessed by said host system must be read so that the read data from said magnetic disk unit is written in said cache memory but is not transferred to said host system;

(iv) a mode for write hit, in which the write data from said host system is transferred to said magnetic disk unit and, at the same time, is written in said cache memory; and (v) a mode for write miss, in which the data from said host system is not written in said cache memory but in said magnetic disk unit.

3. A cache memory, having a plurality of cache blocks, in a magnetic disk controller used in common by a plurality of magnetic disk drive units, comprising:

a directory memory, having entries respectively corresponding to the cache blocks in said cache memory, and fields in which directory data are stored including disk block addresses of disks blocks stored in said cache blocks respectively corresponding to entries and disk drive identifiers representing the respective magnetic disk drive units;

directory search means for determining whether a target disk block is stored in said cache memory by comparing directory data in each entry of said directory memory with target disk block designation data, in response to a read/write command including the target disk block designation data comprising the disk drive identifier and a disk logical address; and storing means for storing the directory data in a directory memory entry corresponding to one of the cache blocks to be replaced, on the basis of a search result of said directory search means and the read/write command.

* * * * *